United States Patent
Wang et al.

(10) Patent No.: US 10,249,302 B2
(45) Date of Patent: Apr. 2, 2019

(54) METHOD AND DEVICE FOR RECOGNIZING TIME INFORMATION FROM VOICE INFORMATION

(71) Applicant: Tencent Technology (Shenzhen) Company Limited, Shenzhen (CN)

(72) Inventors: Fei Wang, Shenzhen (CN); Hao Xu, Shenzhen (CN); Xiaobing Feng, Shenzhen (CN); Zhenxing Xu, Shenzhen (CN); Guodong Pei, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/698,423

(22) Filed: Sep. 7, 2017

(65) Prior Publication Data
US 2017/0372702 A1   Dec. 28, 2017

Related U.S. Application Data

(63) Continuation-in-part of application No. PCT/CN2016/086125, filed on Jun. 17, 2016.

(30) Foreign Application Priority Data

Jul. 31, 2015   (CN) .......................... 2015 1 0465853

(51) Int. Cl.
*G10L 15/26* (2006.01)
*G10L 15/22* (2006.01)
(Continued)

(52) U.S. Cl.
CPC ............ *G10L 15/265* (2013.01); *G06F 16/00* (2019.01); *G06F 17/27* (2013.01);
(Continued)

(58) Field of Classification Search
None
See application file for complete search history.

(56) References Cited

U.S. PATENT DOCUMENTS 6,658,455 B1 * 12/2003 Weinman, Jr. ......... G06Q 50/22
709/203
8,880,406 B2 * 11/2014 Santos-Lang ........... G10L 15/22
434/169
(Continued)

FOREIGN PATENT DOCUMENTS

CN   101609445 A   12/2009
CN   102207845 A   10/2011
(Continued)

OTHER PUBLICATIONS

Tencent Technology, ISRWO, PCT/CN2016/086125, dated Sep. 1, 2016, 8 pgs.
(Continued)

*Primary Examiner* — Neeraj Sharma
(74) *Attorney, Agent, or Firm* — Morgan, Lewis & Bockius LLP

(57) ABSTRACT

A method for recognizing time information from speech data includes: obtaining text information corresponding to speech data; identifying a first time feature contained in the speech data based on the text information; searching within a respective configuration file corresponding to the first time feature to obtain a corresponding time identifier for the first time feature; assigning the corresponding time identifier to a field that is in intermediate time data and that corresponds to the respective configuration file in which the first time feature is located, the intermediate time data comprising multiple fields, and each field being corresponding to a respective configuration file of a plurality of configuration files, each of the plurality of configuration files corresponding a respective category related to time; and obtaining,
(Continued)

according to content of one or more fields in the intermediate time data, system time data corresponding to the time information contained in the speech data.

17 Claims, 9 Drawing Sheets

(51) Int. Cl.
  *G06F 17/27* (2006.01)
  *G06F 16/00* (2019.01)
(52) U.S. Cl.
  CPC .......... *G06F 17/2785* (2013.01); *G10L 15/22* (2013.01); *G10L 2015/223* (2013.01); *G10L 2015/228* (2013.01)

(56) References Cited

U.S. PATENT DOCUMENTS

| | | | | |
|---|---|---|---|---|
| 9,922,332 | B2* | 3/2018 | Sant'Anselmo | G06Q 10/10 |
| 2005/0228665 | A1* | 10/2005 | Kobayashi | G06F 17/3082 |
| | | | | 704/246 |
| 2006/0143559 | A1* | 6/2006 | Spielberg | G06F 3/165 |
| | | | | 715/201 |
| 2009/0119062 | A1* | 5/2009 | Owens | G06Q 10/10 |
| | | | | 702/176 |
| 2011/0035219 | A1* | 2/2011 | Kadirkamanathan | ........ |
| | | | | G10L 15/005 |
| | | | | 704/239 |
| 2011/0071833 | A1* | 3/2011 | Shi | G06F 17/3074 |
| | | | | 704/251 |
| 2014/0025376 | A1* | 1/2014 | Wasserblat | G10L 25/51 |
| | | | | 704/238 |
| 2014/0244712 | A1* | 8/2014 | Walters | H04L 67/10 |
| | | | | 709/202 |
| 2016/0070580 | A1* | 3/2016 | Johnson | H04L 67/141 |
| | | | | 715/708 |

FOREIGN PATENT DOCUMENTS

| | | |
|---|---|---|
| CN | 103886093 A | 6/2014 |
| CN | 104021787 A | 9/2014 |
| JP | 2010218473 A | 9/2010 |
| WO | WO 2014168502 A1 | 10/2014 |

OTHER PUBLICATIONS

Tencent Technology, IPRP, PCT/CN2016/086125, dated Feb. 6, 2018, 7 pgs.

\* cited by examiner

| | |
|---|---|
| Monday (Expression 1) | 1 |
| Tuesday (Expression 1) | 2 |
| Wednesday (Expression 1) | 3 |
| Thursday (Expression 1) | 4 |
| Friday (Expression 1) | 5 |
| Saturday (Expression 1) | 6 |
| Sunday (Expression 1) | 7 |
| Sunday (Expression 2) | 7 |
| Sunday (Expression 3) | 7 |
| Monday (Expression 2) | 1 |
| Tuesday (Expression 2) | 2 |
| Wednesday (Expression 2) | 3 |
| Thursday (Expression 2) | 4 |
| Friday (Expression 2) | 5 |
| Saturday (Expression 2) | 6 |
| Sunday (Expression 4) | 7 |
| Sunday (Expression 5) | 7 |
| Sunday (Expression 6) | 7 |
| Monday (Expression 3) | 1 |
| Tuesday (Expression 3) | 2 |
| Wednesday (Expression 3) | 3 |
| Thursday (Expression 3) | 4 |
| Friday (Expression 3) | 5 |
| Saturday (Expression 3) | 6 |
| Sunday (Expression 7) | 7 |
| Sunday (Expression 8) | 7 |
| Sunday (Expression 9) | 7 |

FIG. 10

| Time feature table | Time identifier table |
|---|---|
| Monday (Expression 1) | |
| Tuesday (Expression 1) | 1 |
| Wednesday (Expression 1) | |
| Thursday (Expression 1) | |
| Friday (Expression 1) | |
| Saturday (Expression 1) | 2 |
| Sunday (Expression 1) | |
| Sunday (Expression 2) | |
| Sunday (Expression 3) | |
| Monday (Expression 2) | 3 |
| Tuesday (Expression 2) | |
| Wednesday (Expression 2) | |
| Thursday (Expression 2) | |
| Friday (Expression 2) | 4 |
| Saturday (Expression 2) | |
| Sunday (Expression 4) | |
| Sunday (Expression 5) | |
| Sunday (Expression 6) | 5 |
| Monday (Expression 3) | |
| Tuesday (Expression 3) | |
| Wednesday (Expression 3) | |
| Thursday (Expression 3) | 6 |
| Friday (Expression 3) | |
| Saturday (Expression 3) | |
| Sunday (Expression 7) | |
| Sunday (Expression 8) | 7 |
| Sunday (Expression 9) | |

FIG. 11

METHOD AND DEVICE FOR RECOGNIZING TIME INFORMATION FROM VOICE INFORMATION

RELATED APPLICATION

This application is a continuation-in-part application of PCT Application No. PCT/CN2016/086125, entitled "METHOD AND DEVICE FOR RECOGNIZING TIME INFORMATION FROM SPEECH DATA", filed Jun. 17, 2016, which claims priority to Chinese Patent Application No. 201510465853.7, entitled "METHOD AND DEVICE FOR RECOGNIZING TIME INFORMATION FROM SPEECH DATA" filed with the Chinese Patent Office on Jul. 31, 2015, both of which are incorporated herein by reference in their entirety.

FIELD OF THE TECHNOLOGY

This application relates to the field of voice recognition technologies, and in particular, to a method and device for recognizing time information from speech data.

BACKGROUND

With development of the voice recognition technologies, voice recognition is combined to a terminal application, to achieve a search query function or an operating function through voice interaction, for example, querying weather and flight information, searching tasty foods around, making a call, setting a remainder, adjusting the clock, or playing music. When a user performs voice interaction with the terminal, a voice instruction usually carries time information, for example, reminding to have a meeting at 10 a.m. on May 5, querying flights from Shenzhen to Beijing on next Monday, or setting an alarm at 8 a.m. tomorrow.

SUMMARY

Embodiments of this application disclose a method and device for recognizing time information from speech data. When modifying or adding a key recognition word of a voice instruction, program code does not need to be modified or recoded, and therefore the operability is strong.

In some embodiments, a method for recognizing time information from speech data, including the following steps:

collecting speech data, and recognizing the speech data that contains time information, to obtain text information corresponding to the speech data;

recognizing at least onetime feature matching the text information, and searching at least one configuration file according to the matching time feature, to obtain a corresponding time identifier;

assigning the corresponding time identifier to a field that is in intermediate time data and that corresponds to a configuration file in which the matching time feature is located, the intermediate time data including multiple fields, and each field being corresponding to the configuration file; and obtaining, according to content of each field in the intermediate time data, time data corresponding to the time information in the speech data.

In some embodiments, a device for recognizing time information from speech data, including:

a voice collection module, configured to collect speech data, and recognize the speech data that contains time information, to obtain text information corresponding to the speech data;

a configuration query module, configured to recognize at least onetime feature matching the text information, and search at least one configuration file according to the matching time feature, to obtain a corresponding time identifier;

an intermediate assignment module, configured to assign the corresponding time identifier to a field that is in intermediate time data and that corresponds to a configuration file in which the matching time feature is located, the intermediate time data including multiple fields, and each field being corresponding to the configuration file; and a time conversion module, configured to obtain, according to content of each field in the intermediate time data, time data corresponding to the time information in the speech data.

According to embodiments of this application, a time feature that may possibly occur in speech data is placed in a corresponding category of configuration file, and the configuration files of all categories are in one-to-one correspondence to all fields in intermediate time data (e.g., each category corresponds to one distinct configuration file and each configuration file corresponds to one distinct field in the intermediate time data). When recognizing time information in the speech data, a matching time feature is searched and identified from one of the configuration files, and a time identifier corresponding to the matching time feature is obtained from the configuration file. The corresponding time identifier that is obtained is assigned to a corresponding field in the intermediate time data for the category of the configuration file in which the matching time feature is identified, and exact time data (e.g., absolute system time data) is generated according to content of this field. In this way, all key time features that may exist in any input speech data are placed in a respective configuration file of a plurality of configuration files that correspond to different time categories. A recognition program only needs to extract a time identifier corresponding to the time feature from the configuration file, and obtains the extract system time data by converting an intermediate file containing the intermediate time data in accordance with the method described herein. Therefore, program code is much more readable, effectively avoiding lengthy and complicated program code. Only the configuration file needs to be modified so as to modify or add a new time feature that came into use in the real world, without modifying and recoding the program code. This simplifies a process of modifying the recognition program, and facilitates maintenance for the program code.

BRIEF DESCRIPTION OF THE DRAWINGS

FIG. 10 is a schematic diagram of a configuration file in accordance with some embodiments; and FIG. 11 is a schematic diagram of a configuration file in accordance with some embodiments.

Implementation, functional features, and advantages of this application are further described with reference to the embodiments and the accompanying drawings.

DESCRIPTION OF EMBODIMENTS

It should be understood that the specific embodiments described herein are merely intended to explain this application, but are not intended to limit this application.

Conventionally, time information in a voice instruction is recognized in a hard coding manner. Specifically, various keywords are coded in program code, and the keywords in the voice instruction are converted into corresponding time parameters after being recognized, so as to generate corresponding time. However, the hard coding manner needs to add all time keywords into the code.

Figure 1:
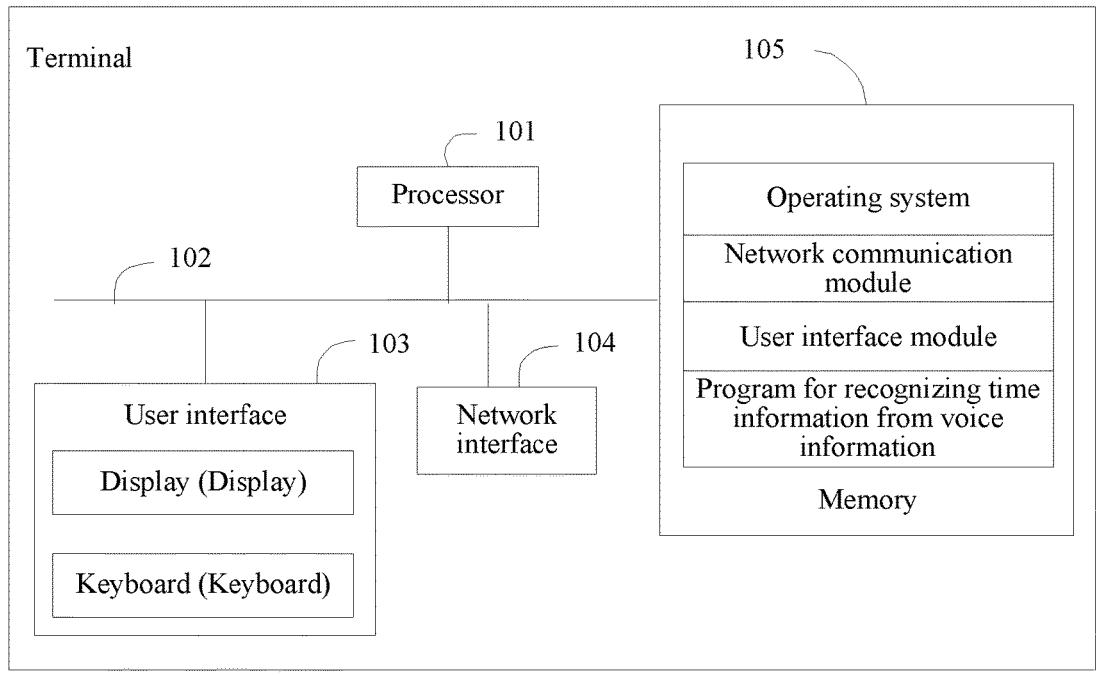
FIG. 1 is a master diagram of a terminal at which a device for recognizing time information from speech data is located in accordance with some embodiments.

Referring to FIG. 1, FIG. 1 is a master diagram of a terminal at which a device for recognizing time information from speech data is located in accordance with some embodiments. The terminal may be a mobile phone, a pad, or a computer, and may include: at least one processor 101, for example, a CPU, at least one network interface 104, a user interface 103, a memory 105, and at least one communications bus 102. The communications bus 102 is configured to achieve connections and communications between these components. The user interface 103 may include a display and a keyboard, and may further include standard wired interface and radio interface. The network interface 104 may include standard wired interface and radio interface (for example, a WiFi interface). The memory 105 may be a high-speed RAM memory, or may be a non-volatile memory, for example, at least one magnetic disk memory. The memory 105 may also be at least one storage device that is located far away from the foregoing processor 101. The memory 105, as computer storage medium, may include an operating system, a network communication module, a user interface module, and a program for recognizing time information from speech data. in accordance with some embodiments, the speech data may be natural speech data, for example, speech data in a natural language expressed by people.

In the terminal at which the device for recognizing time information from speech data is located shown in FIG. 1, the network interface 104 is mainly configured to be connected to a server or another terminal, so as to perform data communications with the server or the other terminal. Moreover, the user interface 103 is mainly configured to receive a user instruction, and interact with the user. The processor 101 may be configured to invoke the program that is stored in the memory 105 and that is for recognizing time information from speech data, and perform the following steps:

collecting the speech data by using the user interface 103, and recognizing the speech data that contains the time information, to obtain text information corresponding to the speech data (e.g., via speech-to-text technology);

recognizing at least one time feature (e.g., an expression for a date, an expression for an hour of the day, etc.) matching the text information (e.g., recognizing an expression for a date from a portion of the text generated from the speech data), and searching at least one configuration file according to the matching time feature (e.g., searching for the recognized expression from a configuration file that corresponds to a time category of the recognized expression), to obtain a corresponding time identifier (e.g., a value for the time feature represented by the recognized expression);

assigning the corresponding time identifier to a field that is in intermediate time data and that corresponds to a configuration file in which the matching time feature is located, the intermediate time data including multiple fields, and each field being corresponding to a respective configuration file that is of the same time category as the field; and obtaining, according to content of each field in the intermediate time data, time data (e.g., absolute system time data) corresponding to the time information in the speech data.

In accordance with some embodiments, the fields in the intermediate time data may be: fields corresponding to the foregoing configuration files.

In an embodiment, the processor 101 may further perform the following operations in addition to invoke the program that is stored in the memory 105 and that is for recognizing time information from speech data:

receiving a new recorded time feature (e.g., a new time feature that is a new way of expressing a time feature that has recently come into use in the real world) by using the user interface 103, and determining a time category (e.g., a date category, an hour-of-day category, a morning/afternoon category, a month category, etc.) corresponding to the new time feature;

adding the new time feature into a corresponding configuration file of the time category corresponding to the new time feature; and determining whether the configuration file of the corresponding category has a time feature having a meaning same to that of the new time feature;

if yes, setting, according to a time identifier of the time feature that has the same meaning, a time identifier corresponding to the new time feature;

if not, providing a new time identifier for the new time feature.

In an embodiment, the processor 101 may further perform the following operations in addition to invoke the program that is stored in the memory 105 and that is for recognizing time information from speech data:

Searching for, in a time feature table in each configuration file, the at least one time feature matching the text information; and Searching for, in a time identifier table in the configuration file in which the matching time feature is located, the time identifier corresponding to the matching time feature.

In an embodiment, the processor 101 may further perform the following operations in addition to invoke the program that is stored in the memory 105 and that is for recognizing time information from speech data:

obtaining a current time when a morning/afternoon field in the assigned intermediate time data is not assigned, and a date field is not assigned or is same to date of the current time; and determining whether a time identifier of a time point field in the assigned intermediate time data is greater than a time point of the current time;

if yes, setting the morning/afternoon field in the intermediate time data to be consistent with a time period of the current time;

if not, setting the morning/afternoon field in the intermediate time data to be contrary to the time period of the current time.

In an embodiment, the processor 101 may further perform the following operations in addition to invoke the program that is stored in the memory 105 and that is for recognizing time information from speech data:

obtaining a current time when a day-of-week field in the assigned intermediate time data is assigned, and a this week/next week field is not assigned; and determining whether a time identifier of the day-of-week field in the assigned intermediate time data is greater than day-of-week of the current time;

if yes, setting the this week/next week field in the intermediate time data as this week;

if not, setting this week/next week field in the intermediate time data as next week.

In an embodiment, the processor 101 may further perform the following operations in addition to invoke the program that is stored in the memory 105 and that is for recognizing time information from speech data:

obtaining a current time when the matching time feature includes tomorrow; and assigning a date field in the intermediate time data to be same to date of the current time when the current time is within a range from 0 a.m. to x a.m., where x is a preset time point.

As described above, in some embodiments, the terminal performs the above process as follows: obtaining text information corresponding to speech data; identifying at least a first time feature contained in the speech data based on the text information; searching within a respective configuration file corresponding to the first time feature to obtain a corresponding time identifier for the first time feature; assigning the corresponding time identifier to a field that is in intermediate time data and that corresponds to the respective configuration file in which the first time feature is located, the intermediate time data comprising multiple fields, and each field being corresponding to a respective configuration file of a plurality of configuration files, each of the plurality of configuration files corresponding a respective category related to time; and obtaining, according to content of one or more fields in the intermediate time data, system time data corresponding to the time information contained in the speech data.

In some embodiments, the terminal receives a new time feature that does not exist in the plurality of configuration files, and a category corresponding to the new time feature; the terminal adds the new time feature into a respective configuration file of the category corresponding to the new time feature; determining whether the respective configuration file of the corresponding category has a time feature having to the same meaning as that of the new time feature; in accordance with a determination that the respective configuration file of the corresponding category has a time feature having the same meaning as that of the new time feature, the terminal sets, according to a time identifier of the time feature that has the same meaning, a time identifier corresponding to the new time feature; and in accordance with a determination that the respective configuration file of the corresponding category does not have a time feature having the same meaning as that of the new time feature, the terminal provides a new time identifier for the new time feature in the respective configuration file of the corresponding category.

In some embodiments, identifying at least the first time feature contained in the speech data based on the text information includes: searching, in a time feature table in each configuration file of the plurality of configuration files, for a time feature that matches at least a portion of the text information.

In some embodiments, searching within a respective configuration file corresponding to the first time feature to obtain a corresponding time identifier for the first time feature includes: searching, in a time identifier table in the respective configuration file in which the first time feature is located, the time identifier corresponding to the first time feature.

In some embodiments, obtaining, according to content of one or more fields in the intermediate time data, system time data corresponding to the time information contained in the speech data, includes: obtaining a current time in accordance with a determination that a morning/afternoon field in the intermediate time data does not have an assigned value, and that a date field does not have an assigned value or is assigned the same date as a current date; and determining whether a time identifier of a time point field in the intermediate time data is later than a time point of the current time; in accordance with a determination that the time identifier of the time point field in the intermediate time data is later than the time point of the current time, setting the morning/afternoon field in the intermediate time data to be a morning/afternoon value that is consistent with the current time; and in accordance with a determination that the time identifier of the time point field in the intermediate time data is earlier than the time point of the current time, setting the morning/afternoon field in the intermediate time data to be a morning/afternoon value that is different from a morning/afternoon value consistent with the current time.

In some embodiments, the terminal obtains a current time in accordance with a determination that a day-of-week field in the intermediate time data has an assigned value, and that a this-week/next-week field does not have an assigned value; the terminal determines whether a time identifier of the day-of-week field in the intermediate time data is later than a day-of-week value of the current time; in accordance with a determination that the time identifier of the day-of-week field in the intermediate time data is later than the day-of-week value of the current time, the terminal sets the value of the this-week/next-week field in the intermediate time data as this week; and in accordance with a determination that the time identifier of the day-of-week field in the intermediate time data is earlier than the day-of-week value of the current time, the terminal sets the value of the this-week/next-week field in the intermediate time data as next week.

In some embodiments, the terminal obtains a current time in accordance with a determination that the first time feature corresponds to tomorrow; and the terminal assigns, to a date field in the intermediate time data, a date of the current time when the current time is within a range from 0 a.m. to x a.m., wherein x is a preset time point.

According to the device for recognizing time information from speech data and the terminal at which the device is located that are described in FIG. 1 of this embodiment, a time feature that may possibly occur in text information in the speech data is placed in a corresponding category of configuration file, and the configuration files of all categories are in one-to-one correspondence to all fields in intermediate time data. When recognizing time information in the speech data, a matching time feature is searched from the configuration file, and a time identifier corresponding to the matching time feature is obtained. The corresponding time identifier is assigned to a corresponding field in the intermediate time data, and exact time data is generated according to content of this field. In this way, all key time features to be matched are placed in a respective configuration file. A recognition program only needs to extract a time identifier corresponding to the time feature from the configuration file, and obtains the extract time data by converting an intermediate file. Therefore, program code is much more readable, effectively avoiding lengthy program code. Only the configuration file needs to be modified so as to modify or add a time feature, without modifying and recoding the program code. This simplifies a process of modifying the recognition program, and facilitates maintenance for the program code.

Figure 2:
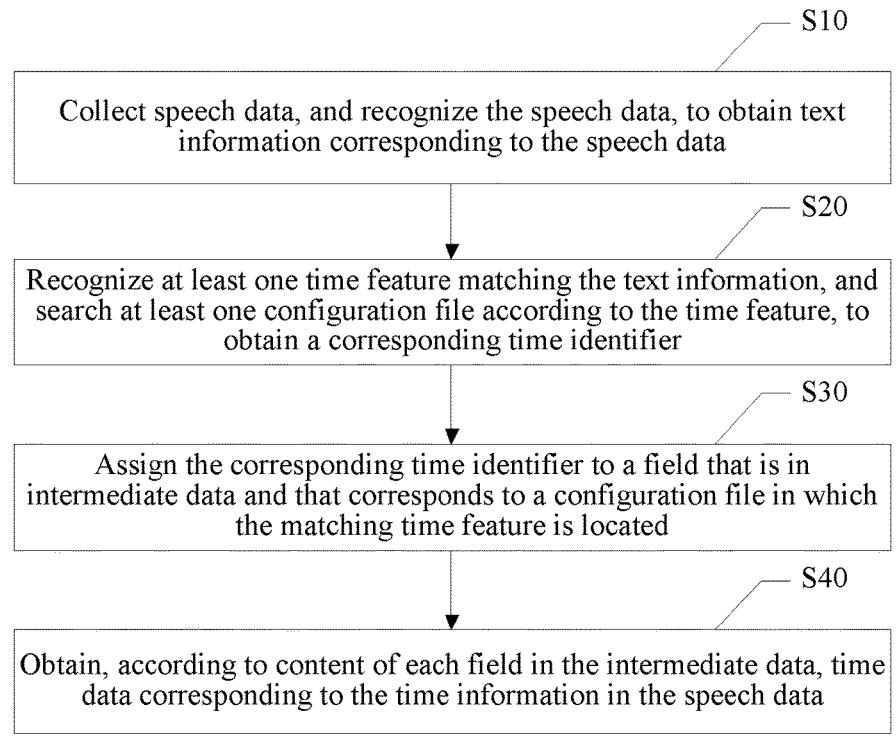
FIG. 2 is a flowchart of a method for recognizing time information from speech data in accordance with some embodiments.

As shown in FIG. 2, FIG. 2 is a flowchart of a method for recognizing time information from speech data in accordance with some embodiments. The method for recognizing time information from speech data includes the following steps:

Step S10: Collect speech data, and recognize the speech data, to obtain text information corresponding to the speech data.

The terminal carrier in accordance with some embodiments may be a mobile phone, a pad, or a computer connected with a microphone. When a user starts a voice collection function of the terminal, the terminal collects the speech data of the user by using voice collection devices such as a rheomicrophone or a microphone. In accordance with some embodiments, the time information may be information that is contained in the collected speech data, and that is coded in a voice format for describing time. In this embodiment, not only content of the speech data is recognized, but an operable control instruction for the speech data is obtained, so that the terminal performs a corresponding operation according to the control instruction. Therefore, a terminal system includes a common voice recognition program. The text information corresponding to the speech data is obtained through the voice recognition program, and then the content of the speech data is converted into a standard format in a manner described in this embodiment, so as to generate an operable control instruction. The content of the speech data is not limited. This embodiment uses recognizing the time information in the speech data as an example, and recognition and conversion of other content may also use the solution of this embodiment.

Step S20: Recognize at least one time feature matching the text information, and search at least one configuration file according to the matching time feature, to obtain a corresponding time identifier.

In accordance with some embodiments, the time feature may be information that is contained in the text information, and that is coded in a text format for describing time. In this embodiment, multiple configuration files are provided, where each configuration file corresponds to a time category. For example, a week configuration file includes days of the week and a time feature for each day of the week; a day configuration file includes a time feature of a date; a month configuration file includes a time feature of month; and a hour configuration file includes a time feature of each hour of the day. There are multiple manners for recognizing the time feature in the text information. This embodiment matches content of the text information of the speech data with the time feature of each configuration file, to obtain the matching time feature. For example, the text information of the speech data is "reminding me to have a meeting at half past two p.m. on May 8", then a time feature of "May" is matched in the month configuration file for the month of May, a time feature of "8" is matched in the date configuration file for the date the 8th day of the month, a time feature of "p.m." is matched in a morning/afternoon configuration file as the latter half of the day, a time feature of "two" is matched in the hour configuration file for hour "two" of a listing of hours of the day, and a time feature of "half past" is matched in a minute configuration file for 30 minutes past the hour.

In addition, the time features may further be divided into absolute time features and relative time features. For example, half past ten, the tenth day of a month, January 1, the fifth day of lunar new year, Friday, the Father's Day, the National Day, and the New Year's Eve would not change as the current time changes, and therefore are all absolute time features. 30 minutes later, February 14 of next year, the third day of next month, next Wednesday, and the day after tomorrow all need to use the current time as reference, and therefore are relative time features because specific time corresponding to the time features also changes if the current time changes.

Multiple time features of this category are stored in the configuration file, and each time feature corresponds to one time identifier, as shown in FIG. 10. For example, "May" in the month configuration file corresponds to a time identifier 5, and "8th day" in the date configuration file corresponds to a time identifier 8. For multiple different time features in the same configuration file that have the same meaning, the corresponding time identifiers are also the same. For example, in FIG. 10, nine Chinese expressions of Sunday, which are referred to as Sunday (Expression 1 "Zhouqi"), Sunday (Expression 2 "Zhouri"), Sunday (Expression 3 "Zhoutian"), Sunday (Expression 4 "Xingqiqi"), Sunday (Expression 5 "Xingqiri"), Sunday (Expression 6 "Xingqitian"), Sunday (Expression 7 "Libaiqi"), Sunday (Expression 8 "Libairi"), and Sunday (Expression 9 "Libaitian"), have the same meaning (Sunday) and all correspond to a time identifier 7 (the day seven of the week that starts from Monday). In the foregoing embodiments, the time features of "half past" and ":30" in the minute configuration file "min" have the same meaning, and the corresponding time identifiers are both 30 (30 minutes past the hour). In accordance with some embodiments, the time identifier may be information that is contained in the configuration file, and that is coded in a text format for describing time. Both the time feature and the time identifier may be information coded in a text format. It can be seen from the above that a difference between the time feature and the time identifier may be that the two describe time in different manners.

Step S30: Assign the corresponding time identifier to a field that is in intermediate time data and that corresponds to a configuration file in which the matching time feature is located.

In this embodiment, intermediate time data is further provided, where the intermediate time data includes multiple fields, and each field corresponds to one configuration file. After finding the time feature matching the text information, the terminal assigns the time identifier corresponding to the time feature to a field corresponding to the configuration file in which the matching time feature is located. For example, the configuration file in which the time feature of "May" is located is the month configuration file month. A corresponding field in the intermediate time data is a month field month, where a variable of the month field is m, and a unit is "month". The time identifier 5 corresponding to the time feature of "May" is assigned to the variable of the month field. That is, m is made to be equal to 5, and this field is "May" after being assigned.

Step S40: Obtain, according to content of each field in the intermediate time data, time data corresponding to the time information in the speech data.

After the time identifiers corresponding to all matching time features in the text information of the speech data are assigned to corresponding fields in the intermediate time data, the terminal obtains exact time data according to the assigned fields in the intermediate time data. The obtained time data includes absolute time and relative time. The absolute time includes specific time and specific date, and also includes lunar date and holidays, for example, the fifth day of the fifth lunar month, the Mid-Autumn Day, and the Father's Day. Relative date is an offset with respect to the current time. For example, if today is March 1, and content obtained according to an assigned field in the intermediate time data is five days later, exact time converted by adding five days to the current date is March 6.

According to this embodiment, a time feature that may possibly occur in text information of speech data is placed in a corresponding category of configuration file, and the configuration files of all categories are in one-to-one correspondence to all fields in intermediate time data. When recognizing time information in the speech data, a matching time feature is searched from the configuration file, and a time identifier corresponding to the matching time feature is obtained. The corresponding time identifier is assigned to a corresponding field in the intermediate time data, and exact time data is generated according to content of this field. In this way, all key time features to be matched are placed in a respective configuration file. A recognition program only needs to extract a time identifier corresponding to the time feature from the configuration file, and obtains the extract time data by converting an intermediate file. Therefore, program code is much more readable, effectively avoiding lengthy program code. Only the configuration file needs to be modified so as to modify or add a time feature, without modifying and recoding the program code. This simplifies a process of modifying the recognition program, and facilitates maintenance for the program code.

Figure 3:
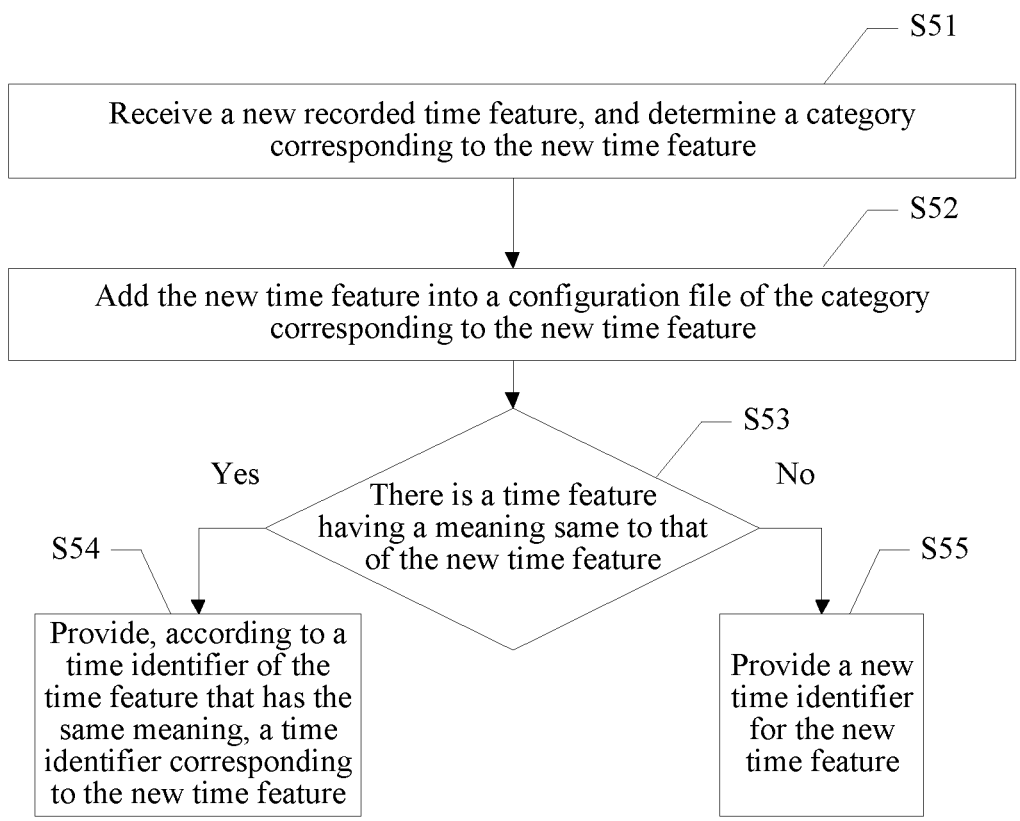
FIG. 3 is a flowchart of a method for recognizing time information from speech data in accordance with some embodiments.

As shown in FIG. 3, FIG. 3 is a flowchart of a method for recognizing time information from speech data in accordance with some embodiments. Modification of a configuration file in the method for recognizing time information from speech data includes the following steps:

Step S51: Receive a new recorded time feature, and determine a category corresponding to the new time feature.

Step S52: Add the new time feature into a configuration file of the category corresponding to the new time feature.

Step S53: Determine whether the configuration file of the corresponding category has a time feature having a meaning same to that of the new time feature, if yes, perform step S54, and if not, perform step S55.

Step S54: Provide, according to a time identifier of the time feature that has the same meaning, a time identifier corresponding to the new time feature.

Step S55: Provide a new time identifier for the new time feature.

In this embodiment, when a new key time feature for voice recognition is modified or added, it only needs to add the new time feature into the configuration file of the corresponding category, and provide a corresponding time identifier for the new time feature. If the configuration file includes the time feature having a meaning same to that of the new time feature, the time identifier corresponding to the new time feature is provided according to the time identifier of the time feature that has the same meaning. Otherwise, the new time identifier is set as the time identifier corresponding to the new time feature. In this embodiment, only the configuration file needs to be modified so as to modify or add time feature data, without modifying and recoding program code. This simplifies a process of modifying a recognition program, and facilitates maintenance for the program code.

Figure 4:
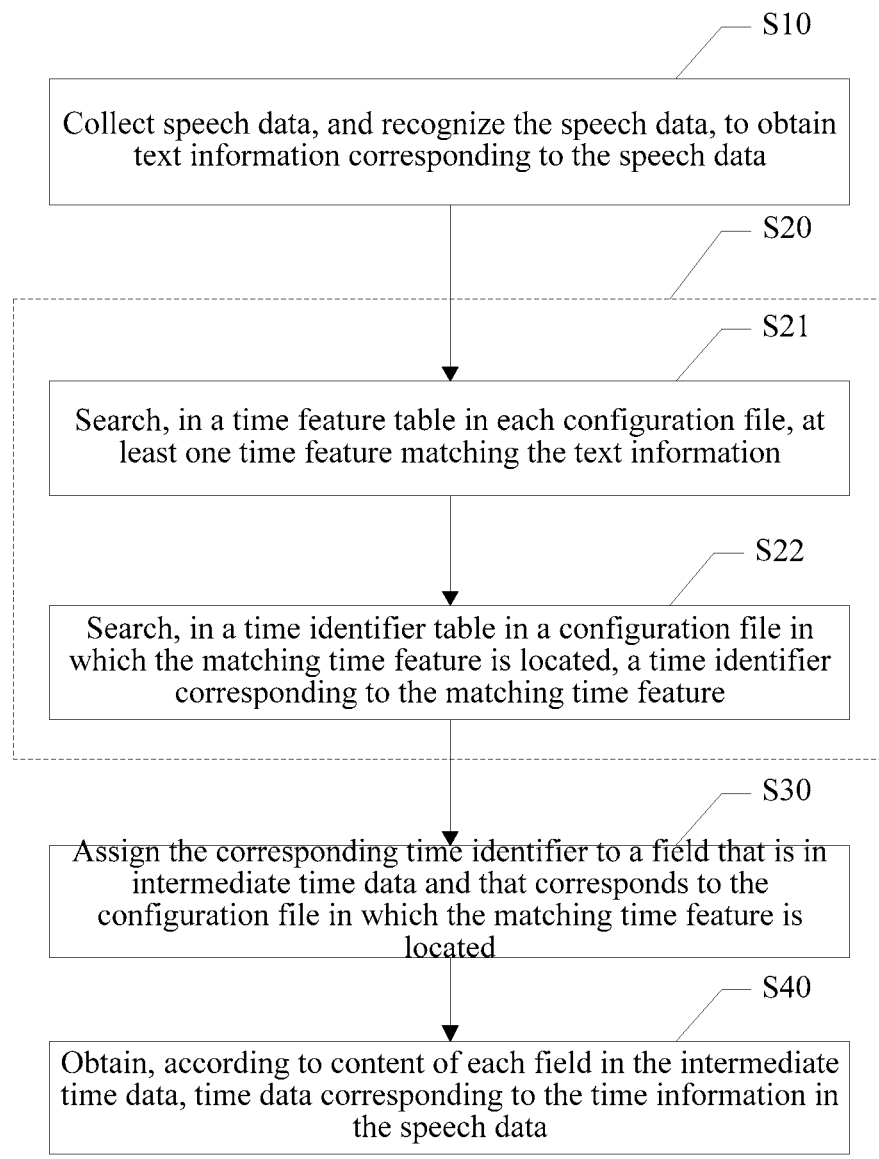
FIG. 4 is a flowchart of a method for recognizing time information from speech data in accordance with some embodiments.

As shown in FIG. 4, FIG. 4 is a flowchart of a method for recognizing time information from speech data in accordance with some embodiments. This embodiment includes the steps in the embodiments shown in FIG. 2, and step S20 further includes:

Step S21: Search, in a time feature table in each configuration file, at least one time feature matching the text information.

Step S22: Search, in a time identifier table in a configuration file in which the matching time feature is located, a time identifier corresponding to the matching time feature.

The configuration file in this embodiment includes two tables. As shown in FIG. 11, one is the time feature table, and the other one is the time identifier table. When establishing the configuration file, a time feature of a corresponding category of the configuration file is stored in the time feature table, and multiple time identifiers are preset in the time identifier table. A mapping relationship is respectively established between each time feature in the time feature table and the time identifiers in the time identifier table. A quantity of the time features may be smaller than or equal to a quantity of the time identifiers, and multiple time features may correspond to one time identifier. When adding a time feature, the added time feature is placed in the time feature table, and whether the time feature table has an original time feature having a meaning same to that of the added time feature is searched. If the time feature table has an original time feature having a meaning same to that of the added time feature, a time identifier matching the original time feature having the meaning same is searched in the time identifier table, and a mapping relationship is established between a found time feature and the added time feature. If the time feature table does not have an original time feature having a meaning same to that of the added time feature, a new time identifier is established in the time identifier table, and a mapping relationship is established between the new time identifier and the new time feature. When searching the matching time feature, a time feature matching the text information is searched in the time feature table of each configuration file, and then the time identifier corresponding to the matching time feature is searched in the time identifier table of the matched configuration file.

Because the configuration files of this embodiment respectively use a time feature table and a time identifier table to store the time features and the time identifiers, matching and searching are more convenient. Meanwhile, adding of the time features and the time identifiers are performed in respective tables, facilitating extensions of the time feature table and the time identifier table. In addition, when multiple time features correspond to one time identifier, in the embodiment shown in FIG. 10, the same time identifier needs to be repeated for multiple times in the configuration file. However, in the embodiment shown in FIG. 11, there is no need to write too much repeated data in the configuration file, and only a mapping relationship between the two tables needs to be established. Both the time feature and the time identifier occur one time in the configuration file, thereby reducing a data volume in the configuration file, and preventing the configuration file from occupying too much storage space.

Figure 5:
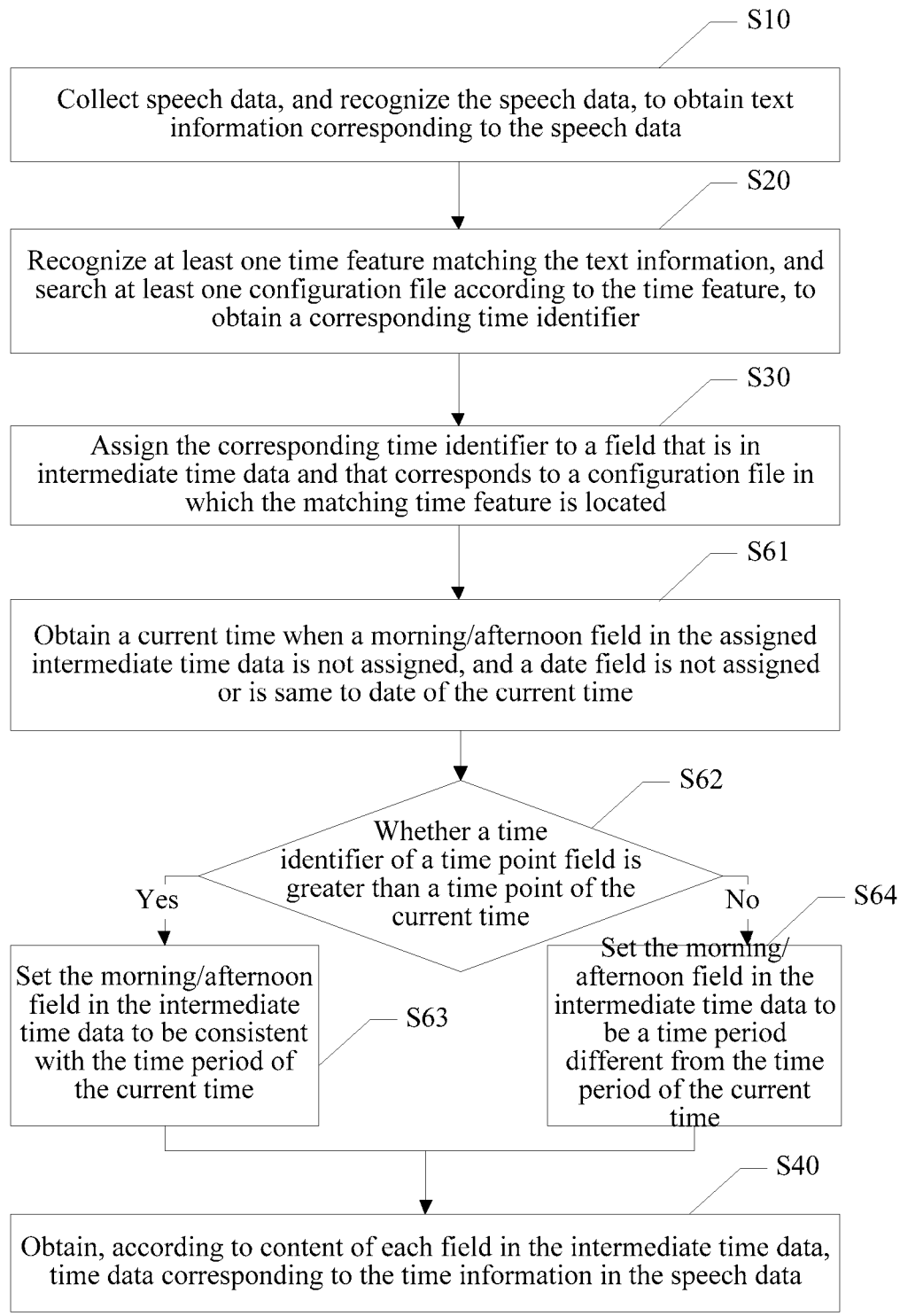
FIG. 5 is a flowchart of a method for recognizing time information from speech data in accordance with some embodiments.

As shown in FIG. 5, FIG. 5 is a flowchart of a method for recognizing time information from speech data in accordance with some embodiments. This embodiment includes the steps in the embodiments shown in FIG. 2, and the following steps are further included before step S40:

Step S61: Obtain a current time when a morning/afternoon field in the assigned intermediate time data is not assigned, and a date field is not assigned or is same to date of the current time.

Step S62: Determine whether a time identifier of a time point field in the assigned intermediate time data is greater than a time point of the current time, if yes, perform step S63, and if not, perform step S64.

Step S63: Set the morning/afternoon field in the intermediate time data to be consistent with the time period of the current time.

Step S64: Set the morning/afternoon field in the intermediate time data to be a time period different from the time period of the current time. For example, the time period of the current time is morning, and then the intermediate time data is set as an afternoon field.

In this embodiment, incomplete information usually occurs when collecting the speech data. For example, it is unclear whether "reminding me to have a meeting at 10 o'clock" refers to 10 a.m. or 10 p.m. In this case, this time needs to be preferentially recognized as a time in the future. In this case, sizes of the current time and a matching time feature of text information of the speech data may be compared to determine whether a time period in the speech data is consistent with the time period of the current time. For example, the current time is 9 a.m. When the text information of the speech data is "reminding me to have a meeting at 10 o'clock", the matching time feature is "10 o'clock" and is later than the current time, it is default that the "10 o'clock" in the speech data is 10 a.m., and an alarm is set as 10 a.m. If the text information of the speech data is "reminding me to have a meeting at 8 o'clock", the matching time feature "8 o'clock" is earlier than the current time, it is default that the "8 o'clock" in the speech data is 8 p.m., and the alarm is set as 8 p.m. In this way, a time conversion error caused by misunderstanding is avoided, helping to improve accuracy of recognizing time in the speech data.

Figure 6:
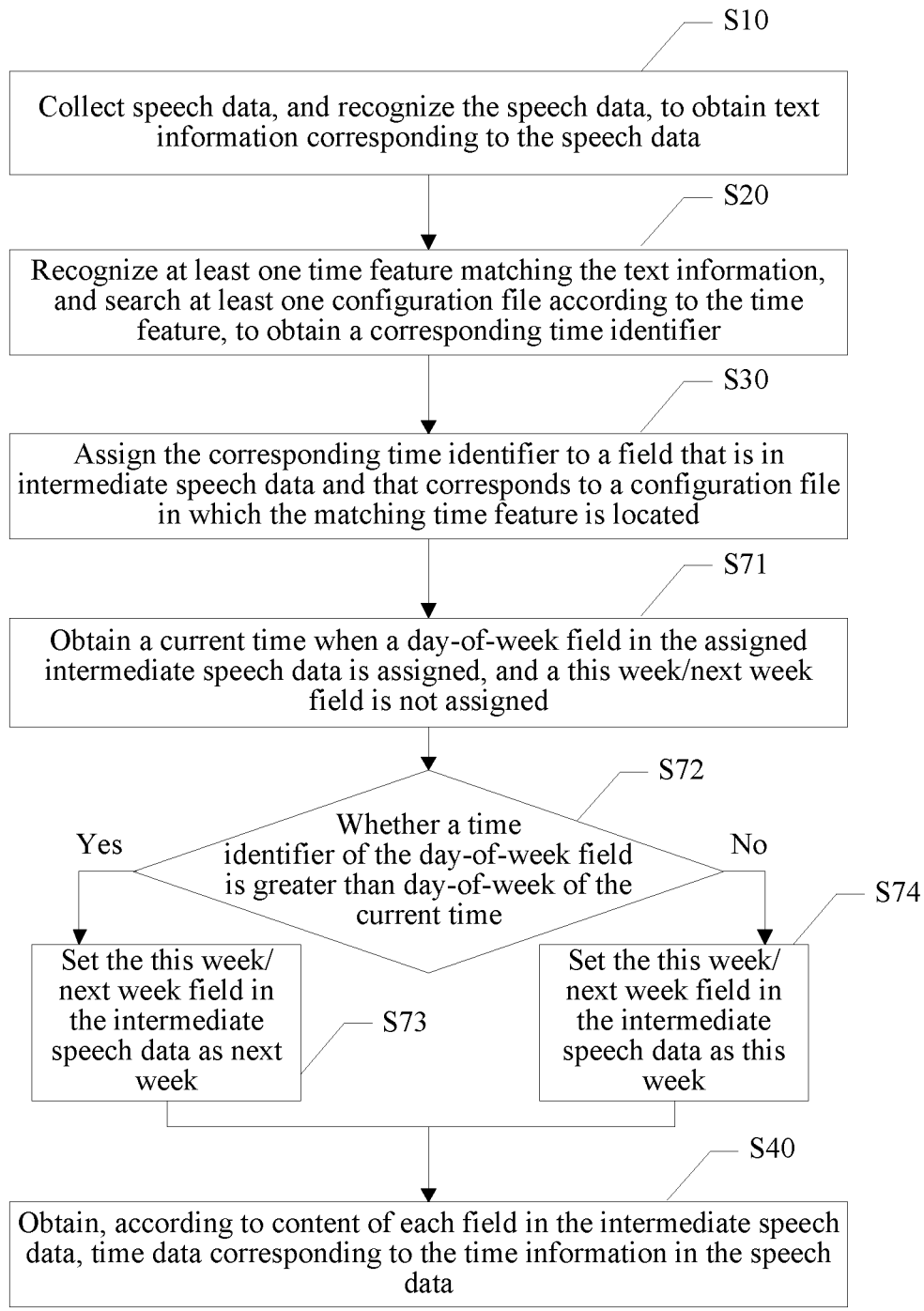
FIG. 6 is a flowchart of a method for recognizing time information from speech data in accordance with some embodiments.

As shown in FIG. 6, FIG. 6 is a flowchart of a method for recognizing time information from speech data in accordance with some embodiments. This embodiment includes the steps in the embodiments shown in FIG. 2, and the following steps are further included before step S40:

Step S71: Obtain a current time when a day-of-week field in the assigned intermediate time data is assigned, and a this week/next week field is not assigned.

Step S72: Determine whether a time identifier of the day-of-week field in the assigned intermediate time data is greater than day-of-week of the current time, if yes, perform step S73, and if not, perform step S74.

Step S74: Set the this week/next week field in the intermediate time data as this week.

Step S73: Set the this week/next week field in the intermediate time data as next week.

Regarding incomplete information in this embodiment, such as "reminding me to have a meeting on Wednesday", it is unclear whether the Wednesday refers to this Wednesday or next Wednesday. In this case, the time also needs to be preferentially recognized as a time in the future. In this case, sizes of the current time and a matching time feature of text information of the speech data may be compared to determine whether day-of-week in the speech data is consistent with the day-of-week of the current time. For example, the day-of-week of the current time is Monday. When the text information of the speech data is "reminding me to have a meeting on Wednesday", a matching time feature is "Wednesday" and is later than the current time, it is default that the "Wednesday" in the speech data is this Wednesday, and an alarm is set as this Wednesday. If the day-of-week of the current time is Friday, the matching time feature "Wednesday" is earlier than the current time, it is default that the "Wednesday" in the speech data is next Wednesday, and the alarm is set as next Wednesday. In this way, a time conversion error caused by misunderstanding is avoided, helping to improve accuracy of recognizing time in the speech data.

Figure 7:
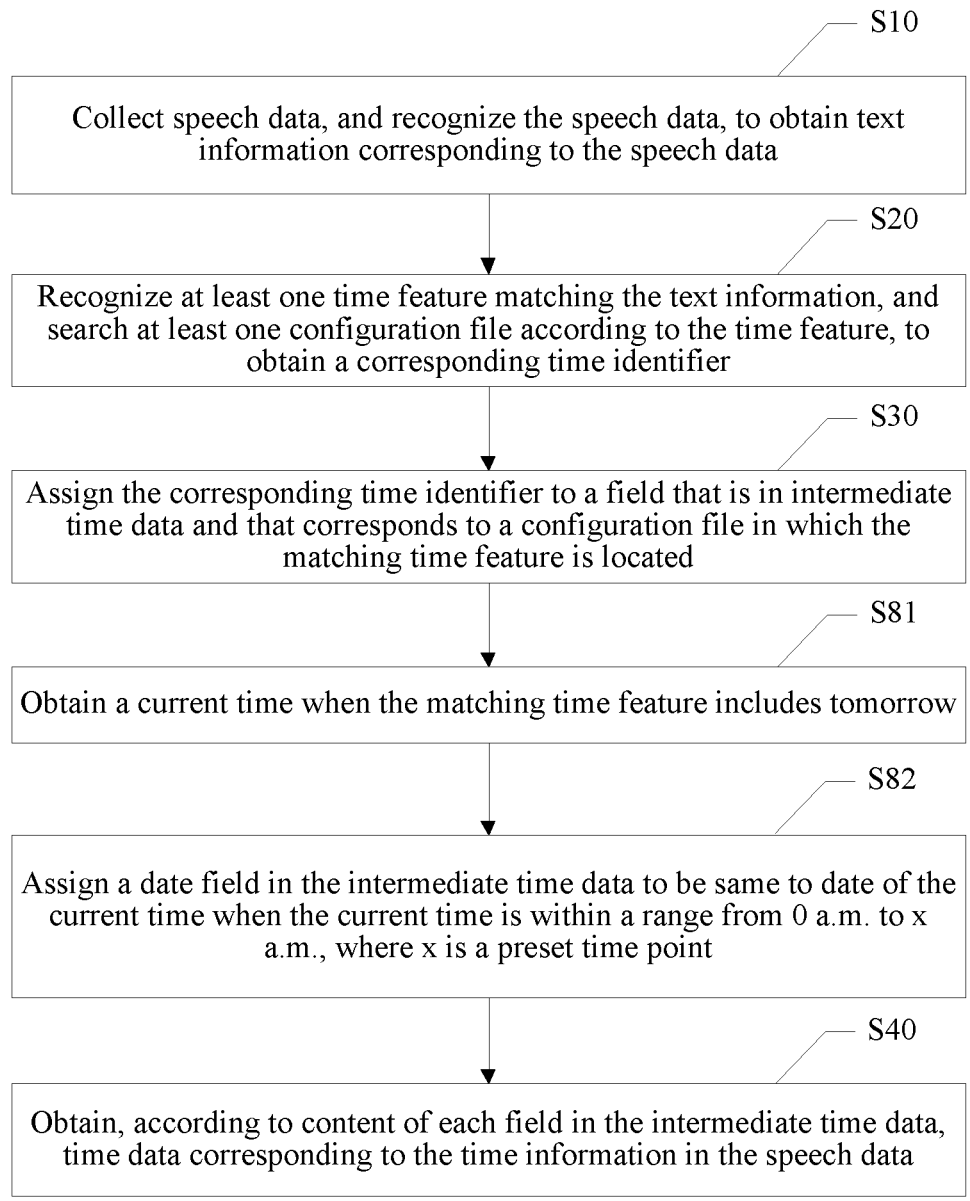
FIG. 7 is a flowchart of a method for recognizing time information from speech data in accordance with some embodiments.

As shown in FIG. 7, FIG. 7 is a flowchart of a method for recognizing time information from speech data in accordance with some embodiments. This embodiment includes the steps in the embodiments shown in FIG. 2, and the following steps are further included before step S40:

Step S81: Obtain a current time when the matching time feature includes tomorrow.

Step S82: Assign a date field in the intermediate time data to be same to date of the current time when the current time is within a range from 0 a.m. to x a.m., where x is a preset time point.

In this embodiment, some special situations may occur when collecting the speech data. People usually consider that an early morning time period belongs to a previous day, but actually the early morning time period belongs to a next day. For example, when the current time is 1 a.m. on a seventh day of a month, it is unclear whether speech data of "reminding me to have a meeting at 10 a.m. tomorrow" refers to 10 a.m. on the seventh day or 10 a.m. on the eighth day. In this case, the user may preset a time range, and it is default that the time range is an early morning time period. Therefore, it is default that a time within the early morning time period belongs to be a previous day. For example, a preset time point is five o'clock, and then the preset early morning time period is from 0 a.m. to 5 a.m., and the current time is 1 a.m. (one o'clock in the morning) on the seventh day. Within this range, the speech data of "reminding me to have a meeting at 10 a.m. tomorrow" refers to 10 a.m. on the seventh day, and an alarm is set as 10 a.m. on the seventh day. In this way, a time conversion error caused by misunderstanding is avoided, helping to improve accuracy of recognizing time in the speech data.

Figure 8:
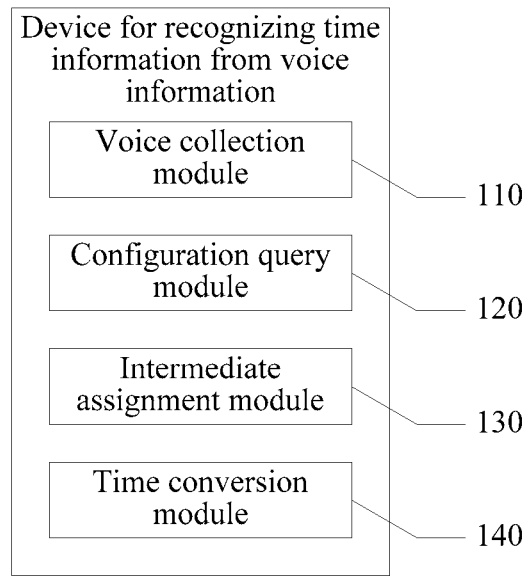
FIG. 8 is a schematic diagram of modules of a device for recognizing time information from speech data in accordance with some embodiments.

As shown in FIG. 8, FIG. 8 is a schematic diagram of modules of a device for recognizing time information from speech data in accordance with some embodiments. The device for recognizing time information from speech data that is disclosed in this embodiment includes:

a voice collection module 110, configured to collect speech data, and recognize the speech data, to obtain text information corresponding to the speech data;

a configuration query module 120, configured to recognize at least one time feature matching the text information, and search at least one configuration file according to the matching time feature, to obtain a corresponding time identifier;

an intermediate assignment module 130, configured to assign the corresponding time identifier to a field that is in intermediate time data and that corresponds to a configuration file in which the matching time feature is located; and a time conversion module 140, configured to obtain, according to content of each field in the intermediate time data, time data corresponding to the time information in the speech data.

The terminal carrier in accordance with some embodiments may be a mobile phone, a pad, or a computer connected with a microphone. When a user starts a voice collection function of the terminal, the terminal collects the speech data of the user by using voice collection devices such as a rheomicrophone or a microphone. In this embodiment, not only content of the speech data is recognized, but an operable control instruction for the speech data is obtained, so that the terminal performs a corresponding operation according to the control instruction. Therefore, a terminal system includes a common voice recognition program. The text information corresponding to the speech data is obtained through the voice recognition program, and then the content of the speech data is converted into a standard format in a manner described in this embodiment, so as to generate an operable control instruction. The content of the speech data is not limited. This embodiment uses recognizing the time information in the speech data as an example, and recognition and conversion of other content may also use the solution of this embodiment.

In this embodiment, multiple configuration files are provided, where each configuration file corresponds to a category. For example, a week configuration file includes day of week and a time feature of day of week; a day configuration file includes a time feature of date; a month configuration file includes a time feature of month; and a hour configuration file includes a time feature of time. There are multiple manners for recognizing the time feature in the text information. This embodiment matches content of the text information of the speech data with the time feature of each configuration file, to obtain the matching time feature. For example, the text information of the speech data is "reminding me to have a meeting at half past two p.m. on May 8", then a time feature of "May" is matched in the month configuration file month, a time feature of "8" is matched in the day configuration file day, a time feature of "p.m." is matched in a morning/afternoon configuration file half day, a time feature of "two" is matched in the hour configuration file hour, and a time feature of "half past" is matched in a minute configuration file min.

In addition, the time features may further be divided into absolute time features and relative time features. For example, half past ten, the tenth day of a month, January 1, the fifth day of lunar new year, Friday, the Father's Day, the National Day, and the New Year's Eve would not change as the current time changes, and therefore are all absolute time features. 30 minutes later, February 14 of next year, the third day of next month, next Wednesday, and the day after tomorrow all need to use the current time as reference, and therefore are relative time features because specific time corresponding to the time features also changes if the current time changes.

Multiple time features of this category are stored in the configuration file, and each time feature corresponds to one time identifier, as shown in FIG. 10. For example, "May" in the month configuration file corresponds to a time identifier 5, and "8" in the day configuration file corresponds to a time identifier 8. For multiple time features that have the same meaning, the corresponding time identifiers are also the same. For example, in FIG. 10, nine Chinese expressions of Sunday, which are referred to as Sunday (Expression 1), Sunday (Expression 2), Sunday (Expression 3), Sunday (Expression 4), Sunday (Expression 5), Sunday (Expression 6), Sunday (Expression 7), Sunday (Expression 8), and Sunday (Expression 9), have the same meaning and all correspond to a time identifier 7. In the foregoing embodiments, the time features of "half past" and ":30" in the minute configuration file min have the same meaning, and the corresponding time identifiers are both 30.

In this embodiment, intermediate time data is further provided, where the intermediate time data includes multiple fields, and each field corresponds to one configuration file. After finding the time feature matching the text information, the terminal assigns the time identifier corresponding to the time feature to a field corresponding to the configuration file in which the matching time feature is located. For example, the configuration file in which the time feature of "May" is located is the month configuration file month. A corresponding field in the intermediate time data is a month field month, where a variable of the month field is m, and a unit is "month". The time identifier 5 corresponding to the time feature of "May" is assigned to the variable of the month field. That is, m is made to be equal to 5, and this field is "May" after being assigned.

After the time identifiers corresponding to all matching time features in the text information of the speech data are assigned to corresponding fields in the intermediate time data, the terminal obtains exact time data according to the assigned fields in the intermediate time data. The obtained time data includes absolute time and relative time. The absolute time includes specific time and specific date, and also includes lunar date and holidays, for example, the fifth day of the fifth lunar month, the Mid-Autumn Day, and the Father's Day. Relative date is an offset with respect to the current time. For example, if today is March 1, and content obtained according to an assigned field in the intermediate time data is five days later, exact time converted by adding five days to the current date is March 6.

According to this embodiment, a time feature that may possibly occur in text information of speech data is placed in a corresponding category of configuration file, and the configuration files of all categories are in one-to-one correspondence to all fields in intermediate time data. When recognizing time information in the speech data, a matching time feature is searched from the configuration file, and a time identifier corresponding to the matching time feature is obtained. The corresponding time identifier is assigned to a corresponding field in the intermediate time data, and exact time data is generated according to content of this field. In this way, all key time features to be matched are placed in a respective configuration file. A recognition program only needs to extract a time identifier corresponding to the time feature from the configuration file, and obtains the extract time data by converting an intermediate file. Therefore, program code is much more readable, effectively avoiding lengthy program code. Only the configuration file needs to be modified so as to modify or add time feature data, without modifying and recoding the program code. This simplifies a process of modifying the recognition program, and facilitates maintenance for the program code.

Figure 9:
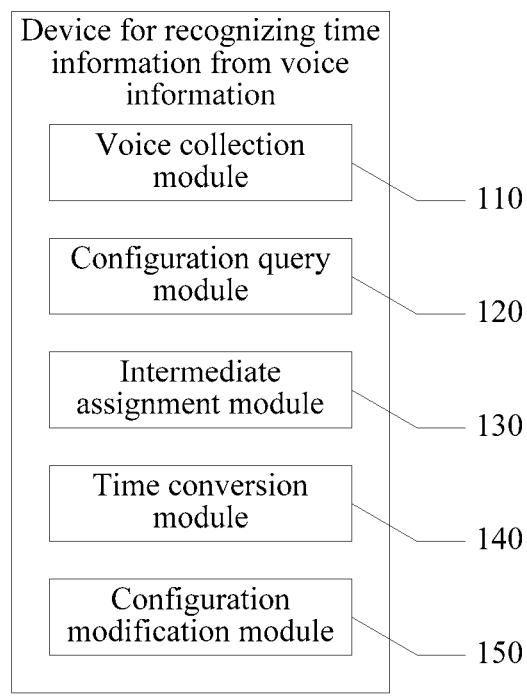
FIG. 9 is a schematic diagram of modules of a device for recognizing time information from speech data in accordance with some embodiments.

As shown in FIG. 9, FIG. 9 is a schematic diagram of modules of a device for recognizing time information from speech data in accordance with some embodiments. This embodiment includes the modules in the embodiments shown in FIG. 8, and further includes a configuration modification module 150 that is configured to:

receive a new recorded time feature, and determine a category corresponding to the new time feature;

add the new time feature into a configuration file of the category corresponding to the new time feature; and determine whether the configuration file of the corresponding category has a time feature having a meaning same to that of the new time feature;

if yes, set, according to a time identifier of the time feature that has the same meaning, a time identifier corresponding to the new time feature;

if not, provide a new time identifier for the new time feature.

In this embodiment, when a new key time feature for voice recognition is modified or added, it only needs to add the new time feature into the configuration file of the corresponding category, and provide a corresponding time identifier for the new time feature. If the configuration file includes the time feature having a meaning same to that of the new time feature, the time identifier corresponding to the new time feature is provided according to the time identifier of the time feature that has the same meaning. Otherwise, the new time identifier is set as the time identifier corresponding to the new time feature. In this embodiment, only the configuration file needs to be modified so as to modify or add time feature data, without modifying and recoding program code. This simplifies a process of modifying a recognition program, and facilitates maintenance for the program code.

Further, the configuration query module 120 is further configured to:

search, in a time feature table in each configuration file, the at least one time feature matching the text information; and search, in a time identifier table in the configuration file in which the matching time feature is located, the time identifier corresponding to the matching time feature.

The configuration file in this embodiment includes two tables. As shown in FIG. 11, one is the time feature table, and the other one is the time identifier table. When establishing the configuration file, a time feature of a corresponding category of the configuration file is stored in the time feature table, and multiple time identifiers are preset in the time identifier table. A mapping relationship is respectively established between each time feature in the time feature table and the time identifiers in the time identifier table. A quantity of the time features may be smaller than or equal to a quantity of the time identifiers, and multiple time features may correspond to one time identifier. When adding a time feature, the added time feature is placed in the time feature table, and whether the time feature table has an original time feature having a meaning same to that of the added time feature is searched. If the time feature table has an original time feature having a meaning same to that of the added time feature, a time identifier matching the original time feature having the meaning same is searched in the time identifier table, and a mapping relationship is established between a found time feature and the added time feature. If the time feature table does not have an original time feature having a meaning same to that of the added time feature, a new time identifier is established in the time identifier table, and a mapping relationship is established between the new time identifier and the new time feature. When searching the matching time feature, a time feature matching the text information is searched in the time feature table of each configuration file, and then the time identifier corresponding to the matching time feature is searched in the time identifier table of the matched configuration file.

Because the configuration files of this embodiment respectively use a time feature table and a time identifier table to store the time features and the time identifiers, matching and searching are more convenient. Meanwhile, adding of the time features and the time identifiers are performed in respective tables, facilitating extensions of the time feature table and the time identifier table. In addition, when multiple time features correspond to one time identifier, in the embodiment shown in FIG. 10, the same time identifier needs to be repeated for multiple times in the configuration file. However, in the embodiment shown in FIG. 11, there is no need to write too much repeated data in the configuration file, and only a mapping relationship between the two tables needs to be established. Both the time feature and the time identifier occur one time in the configuration file, thereby reducing a data volume in the configuration file, and preventing the configuration file from occupying too much storage space.

Further, the intermediate assignment module 130 is further configured to:

obtain a current time when a morning/afternoon field in the assigned intermediate time data is not assigned, and a date field is not assigned or is same to date of the current time; and determine whether a time identifier of a time point field in the assigned intermediate time data is greater than a time point of the current time;

if yes, set the morning/afternoon field in the intermediate time data to be consistent with a time period of the current time;

if not, set the morning/afternoon field in the intermediate time data to be contrary to the time period of the current time.

In this embodiment, incomplete information usually occurs when collecting the speech data. For example, it is unclear whether "reminding me to have a meeting at 10 o'clock" refers to 10 a.m. or 10 p.m. In this case, this time needs to be preferentially recognized as a time in the future. In this case, sizes of the current time and a matching time feature of text information of the speech data may be compared to determine whether a time period in the speech data is consistent with the time period of the current time. For example, the current time is 9 a.m. When the text information of the speech data is "reminding me to have a meeting at 10 o'clock", the matching time feature is "10 o'clock" and is later than the current time, it is default that the "10 o'clock" in the speech data is 10 a.m., and an alarm is set as 10 a.m. If the text information of the speech data is "reminding me to have a meeting at 8 o'clock", the matching time feature "8 o'clock" is earlier than the current time, it is default that the "8 o'clock" in the speech data is 8 p.m., and the alarm is set as 8 p.m. In this way, a time conversion error caused by misunderstanding is avoided, helping to improve accuracy of recognizing time in the speech data.

Further, the intermediate assignment module 130 is further configured to:

obtain a current time when a day-of-week field in the assigned intermediate time data is assigned, and a this week/next week field is not assigned; and determine whether a time identifier of the day-of-week field in the assigned intermediate time data is greater than day-of-week of the current time;

if yes, set the this week/next week field in the intermediate time data as this week;

if not, set the this week/next week field in the intermediate time data as next week.

Regarding incomplete information in this embodiment, such as "reminding me to have a meeting on Wednesday", it is unclear whether the Wednesday refers to this Wednesday or next Wednesday. In this case, the time also needs to be preferentially recognized as a time in the future. In this case, sizes of the current time and a matching time feature of text information of the speech data may be compared to determine whether day-of-week in the speech data is consistent with the day-of-week of the current time. For example, the day-of-week of the current time is Monday. When the text information of the speech data is "reminding me to have a meeting on Wednesday", a matching time feature is "Wednesday" and is later than the current time, it is default that the "Wednesday" in the speech data is this Wednesday, and an alarm is set as this Wednesday. If the day-of-week of the current time is Friday, the matching time feature "Wednesday" is earlier than the current time, it is default that the "Wednesday" in the speech data is next Wednesday, and the alarm is set as next Wednesday. In this way, a time conversion error caused by misunderstanding is avoided, helping to improve accuracy of recognizing time in the speech data.

Further, the intermediate assignment module 130 is further configured to:

obtain a current time when the matching time feature includes tomorrow; and assign a date field in the intermediate time data to be same to date of the current time when the current time is within a range from 0 a.m. to x a.m., where x is a preset time point.

In this embodiment, some special situations may occur when collecting the speech data. People usually consider that an early morning time period belongs to a previous day, but actually the early morning time period belongs to a next day. For example, when the current time is 1 a.m. on a seventh day of a month, it is unclear whether speech data of "reminding me to have a meeting at 10 a.m. tomorrow" refers to 10 a.m. on the seventh day or 10 a.m. on the eighth day. In this case, the user may preset a time range, and it is default that the time range is an early morning time period. Therefore, it is default that a time within the early morning time period belongs to be a previous day. For example, a preset time point is five o'clock, and then the preset early morning time period is from 0 a.m. to 5 a.m., and the current time is 1 a.m. (one o'clock in the morning) on the seventh day. Within this range, the speech data of "reminding me to have a meeting at 10 a.m. tomorrow" refers to 10 a.m. on the seventh day, and an alarm is set as 10 a.m. on the seventh day. In this way, a time conversion error caused by misunderstanding is avoided, helping to improve accuracy of recognizing time in the speech data.

In should be noted that in this specification, the terms "include", "comprise", or any variants thereof are intended to cover a non-exclusive inclusion. Therefore, in the context of a process, a method, an article, or a device that includes a series of elements, the process, method, object, article, or device not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The sequence numbers of the foregoing embodiments of this application are merely for the convenience of description, and do not imply the preference among the embodiments.

Based on the foregoing descriptions of the implementations, a person skilled in the art may clearly understand that the methods in the foregoing embodiments may be implemented by software in addition to a necessary universal hardware platform or by hardware only. In most circumstances, the former is an exemplary implementation. Based on such an understanding, the technical solutions of this application essentially or the part contributing to the existing technology may be implemented in a form of a software product. The computer software product is stored in a storage medium (such as a ROM/RAM, a magnetic disc, or an optical disc), and includes several instructions for instructing a terminal device (which may be a mobile phone, a computer, a server, a network device, or the like) to perform the methods described in the embodiments of this application.

The foregoing descriptions are merely preferred embodiments of this application but are not intended to limit the patent scope of this application. Any equivalent modifications made to the structures or processes based on the content of the specification and the accompanying drawings of this application for direct or indirect use in other relevant technical fields shall also be encompassed in the patent protection scope of this application.

What is claimed is:

1. A method for recognizing time information from speech data, comprising the following steps:

at a device having one or more processors and memory:
obtaining text information corresponding to speech data;
identifying at least a first time feature contained in the speech data based on the text information;
searching within a respective configuration file corresponding to the first time feature to obtain a corresponding time identifier for the first time feature;
assigning the corresponding time identifier to a field that is in intermediate time data and that corresponds to the respective configuration file in which the first time feature is located, the intermediate time data comprising multiple fields, and each field corresponding to a respective configuration file of a plurality of configuration files, each of the plurality of configuration files corresponding to a respective category related to time;
obtaining a current time in accordance with a determination that a day-of-week field in the intermediate time data has an assigned value, and that a this-week/next-week field does not have an assigned value;
determining whether a time identifier of the day-of-week field in the intermediate time data is later than a day-of-week value of the current time;
in accordance with a determination that the time identifier of the day-of-week field in the intermediate time data is later than the day-of-week value of the current time, setting the value of the this-week/next-week field in the intermediate time data as this week;
in accordance with a determination that the time identifier of the day-of-week field in the intermediate time data is earlier than the day-of-week value of the current time, setting the value of the this-week/next-week field in the intermediate time data as next week;
obtaining, according to content of one or more fields in the intermediate time data, system time data corresponding to the time information contained in the speech data; and
generating a calendar reminder at the device according to the system time data corresponding to the time information contained in the speech data.

2. The method for recognizing time information from speech data according to claim 1, further comprising:

receiving a new time feature that does not exist in the plurality of configuration files, and a category corresponding to the new time feature;

adding the new time feature into a respective configuration file of the category corresponding to the new time feature;

determining whether the respective configuration file of the corresponding category has a time feature having to the same meaning as that of the new time feature;

in accordance with a determination that the respective configuration file of the corresponding category has a time feature having the same meaning as that of the new time feature, setting, according to a time identifier of the time feature that has the same meaning, a time identifier corresponding to the new time feature; and in accordance with a determination that the respective configuration file of the corresponding category does not have a time feature having the same meaning as that of the new time feature, providing a new time identifier for the new time feature in the respective configuration file of the corresponding category.

3. The method for recognizing time information from speech data according to claim 1, wherein identifying at least the first time feature contained in the speech data based on the text information includes:

searching, in a time feature table in each configuration file of the plurality of configuration files, for a time feature that matches at least a portion of the text information.

4. The method for recognizing time information from speech data according to claim 3, wherein searching within a respective configuration file corresponding to the first time feature to obtain a corresponding time identifier for the first time feature includes:

searching, in a time identifier table in the respective configuration file in which the first time feature is located, the time identifier corresponding to the first time feature.

5. The method for recognizing time information from speech data according to claim 1, wherein obtaining, according to content of one or more fields in the intermediate time data, system time data corresponding to the time information contained in the speech data, includes:

a determination that a morning/afternoon field in the intermediate time data does not have an assigned value, and that a date field does not have an assigned value or is assigned the same date as a current date; and determining whether a time identifier of a time point field in the intermediate time data is later than a time point of the current time;

in accordance with a determination that the time identifier of the time point field in the intermediate time data is later than the time point of the current time, setting the morning/afternoon field in the intermediate time data to be a morning/afternoon value that is consistent with the current time; and in accordance with a determination that the time identifier of the time point field in the intermediate time data is earlier than the time point of the current time, setting the morning/afternoon field in the intermediate time data to be a morning/afternoon value that is different from a morning/afternoon value consistent with the current time.

6. The method for recognizing time information from speech data according to claim 1, wherein:

the first time feature corresponds to tomorrow; and the method further comprises assigning, to a date field in the intermediate time data, a date of the current time when the current time is within a range from 0 a.m. to x a.m., wherein x is a preset time point.

7. An electronic device for recognizing time information from speech data, comprising:

one or more processors; and memory storing instructions, the instructions, when executed by the one or more processors, cause the processors to perform operations comprising:

obtaining text information corresponding to speech data;

identifying at least a first time feature contained in the speech data based on the text information;

searching within a respective configuration file corresponding to the first time feature to obtain a corresponding time identifier for the first time feature;

assigning the corresponding time identifier to a field that is in intermediate time data and that corresponds to the respective configuration file in which the first time feature is located, the intermediate time data comprising multiple fields, and each field corresponding to a respective configuration file of a plurality of configuration files, each of the plurality of configuration files corresponding to a respective category related to time;

obtaining a current time in accordance with a determination that a day-of-week field in the intermediate time data has an assigned value, and that a this-week/next-week field does not have an assigned value;

determining whether a time identifier of the day-of-week field in the intermediate time data is later than a day-of-week value of the current time;

in accordance with a determination that the time identifier of the day-of-week field in the intermediate time data is later than the day-of-week value of the current time, setting the value of the this-week/next-week field in the intermediate time data as this week;

in accordance with a determination that the time identifier of the day-of-week field in the intermediate time data is earlier than the day-of-week value of the current time, setting the value of the this-week/next-week field in the intermediate time data as next week;

obtaining, according to content of one or more fields in the intermediate time data, system time data corresponding to the time information contained in the speech data; and generating a calendar reminder at the device according to the system time data corresponding to the time information contained in the speech data.

8. The device for recognizing time information from speech data according to claim 7, wherein the operations further comprise:

receiving a new time feature that does not exist in the plurality of configuration files, and a category corresponding to the new time feature;

adding the new time feature into a respective configuration file of the category corresponding to the new time feature;

determining whether the respective configuration file of the corresponding category has a time feature having to the same meaning as that of the new time feature;

in accordance with a determination that the respective configuration file of the corresponding category has a time feature having the same meaning as that of the new time feature, setting, according to a time identifier of the time feature that has the same meaning, a time identifier corresponding to the new time feature; and in accordance with a determination that the respective configuration file of the corresponding category does not have a time feature having the same meaning as that of the new time feature, providing a new time identifier for the new time feature in the respective configuration file of the corresponding category.

9. The device for recognizing time information from speech data according to claim 7, wherein identifying at least the first time feature contained in the speech data based on the text information includes:
    searching, in a time feature table in each configuration file of the plurality of configuration files, for a time feature that matches at least a portion of the text information.

10. The device for recognizing time information from speech data according to claim 9, wherein searching within a respective configuration file corresponding to the first time feature to obtain a corresponding time identifier for the first time feature includes:
    searching, in a time identifier table in the respective configuration file in which the first time feature is located, the time identifier corresponding to the first time feature.

11. The device for recognizing time information from speech data according to claim 7, wherein obtaining, according to content of one or more fields in the intermediate time data, system time data corresponding to the time information contained in the speech data, includes:
    a determination that a morning/afternoon field in the intermediate time data does not have an assigned value, and that a date field does not have an assigned value or is assigned the same date as a current date; and
    determining whether a time identifier of a time point field in the intermediate time data is later than a time point of the current time;
    in accordance with a determination that the time identifier of the time point field in the intermediate time data is later than the time point of the current time, setting the morning/afternoon field in the intermediate time data to be a morning/afternoon value that is consistent with the current time; and
    in accordance with a determination that the time identifier of the time point field in the intermediate time data is earlier than the time point of the current time, setting the morning/afternoon field in the intermediate time data to be a morning/afternoon value that is different from a morning/afternoon value consistent with the current time.

12. The device for recognizing time information from speech data according to claim 7, wherein:
    the first time feature corresponds to tomorrow; and
    the operations further include assigning, to a date field in the intermediate time data, a date of the current time when the current time is within a range from 0 a.m. to x a.m., wherein x is a preset time point.

13. A non-transitory computer-readable storage medium storing instructions, the instructions, when executed by one or more processors, cause the processors to perform operations comprising:
    obtaining text information corresponding to speech data;
    identifying at least a first time feature contained in the speech data based on the text information;
    searching within a respective configuration file corresponding to the first time feature to obtain a corresponding time identifier for the first time feature;
    assigning the corresponding time identifier to a field that is in intermediate time data and that corresponds to the respective configuration file in which the first time feature is located, the intermediate time data comprising multiple fields, and each field corresponding to a respective configuration file of a plurality of configuration files, each of the plurality of configuration files corresponding to a respective category related to time;
    obtaining a current time in accordance with a determination that a day-of-week field in the intermediate time data has an assigned value, and that a this-week/next-week field does not have an assigned value;
    determining whether a time identifier of the day-of-week field in the intermediate time data is later than a day-of-week value of the current time;
    in accordance with a determination that the time identifier of the day-of-week field in the intermediate time data is later than the day-of-week value of the current time, setting the value of the this-week/next-week field in the intermediate time data as this week;
    in accordance with a determination that the time identifier of the day-of-week field in the intermediate time data is earlier than the day-of-week value of the current time, setting the value of the this-week/next-week field in the intermediate time data as next week;
    obtaining, according to content of one or more fields in the intermediate time data, system time data corresponding to the time information contained in the speech data; and
    generating a calendar reminder at the device according to the system time data corresponding to the time information contained in the speech data.

14. The non-transitory computer-readable storage medium according to claim 13, wherein the operations further comprise:
    receiving a new time feature that does not exist in the plurality of configuration files, and a category corresponding to the new time feature;
    adding the new time feature into a respective configuration file of the category corresponding to the new time feature;
    determining whether the respective configuration file of the corresponding category has a time feature having to the same meaning as that of the new time feature;
    in accordance with a determination that the respective configuration file of the corresponding category has a time feature having the same meaning as that of the new time feature, setting, according to a time identifier of the time feature that has the same meaning, a time identifier corresponding to the new time feature; and
    in accordance with a determination that the respective configuration file of the corresponding category does not have a time feature having the same meaning as that of the new time feature, providing a new time identifier for the new time feature in the respective configuration file of the corresponding category.

15. The non-transitory computer-readable storage medium for recognizing time information from speech data according to claim 13, wherein identifying at least the first time feature contained in the speech data based on the text information includes:
    searching, in a time feature table in each configuration file of the plurality of configuration files, for a time feature that matches at least a portion of the text information.

16. The non-transitory computer-readable storage medium for recognizing time information from speech data according to claim 15, wherein searching within a respective configuration file corresponding to the first time feature to obtain a corresponding time identifier for the first time feature includes:

searching, in a time identifier table in the respective configuration file in which the first time feature is located, the time identifier corresponding to the first time feature.

17. The non-transitory computer-readable storage medium for recognizing time information from speech data according to claim 13, wherein obtaining, according to content of one or more fields in the intermediate time data, system time data corresponding to the time information contained in the speech data, includes:
- a determination that a morning/afternoon field in the intermediate time data does not have an assigned value, and that a date field does not have an assigned value or is assigned the same date as a current date; and
- determining whether a time identifier of a time point field in the intermediate time data is later than a time point of the current time;
- in accordance with a determination that the time identifier of the time point field in the intermediate time data is later than the time point of the current time, setting the morning/afternoon field in the intermediate time data to be a morning/afternoon value that is consistent with the current time; and
- in accordance with a determination that the time identifier of the time point field in the intermediate time data is earlier than the time point of the current time, setting the morning/afternoon field in the intermediate time data to be a morning/afternoon value that is different from a morning/afternoon value consistent with the current time.

\* \* \* \* \*